March 8, 1927. 1,620,357
M. JUBLONSKY
AUTOMOBILE BUMPER
Filed May 22, 1926 2 Sheets-Sheet 1
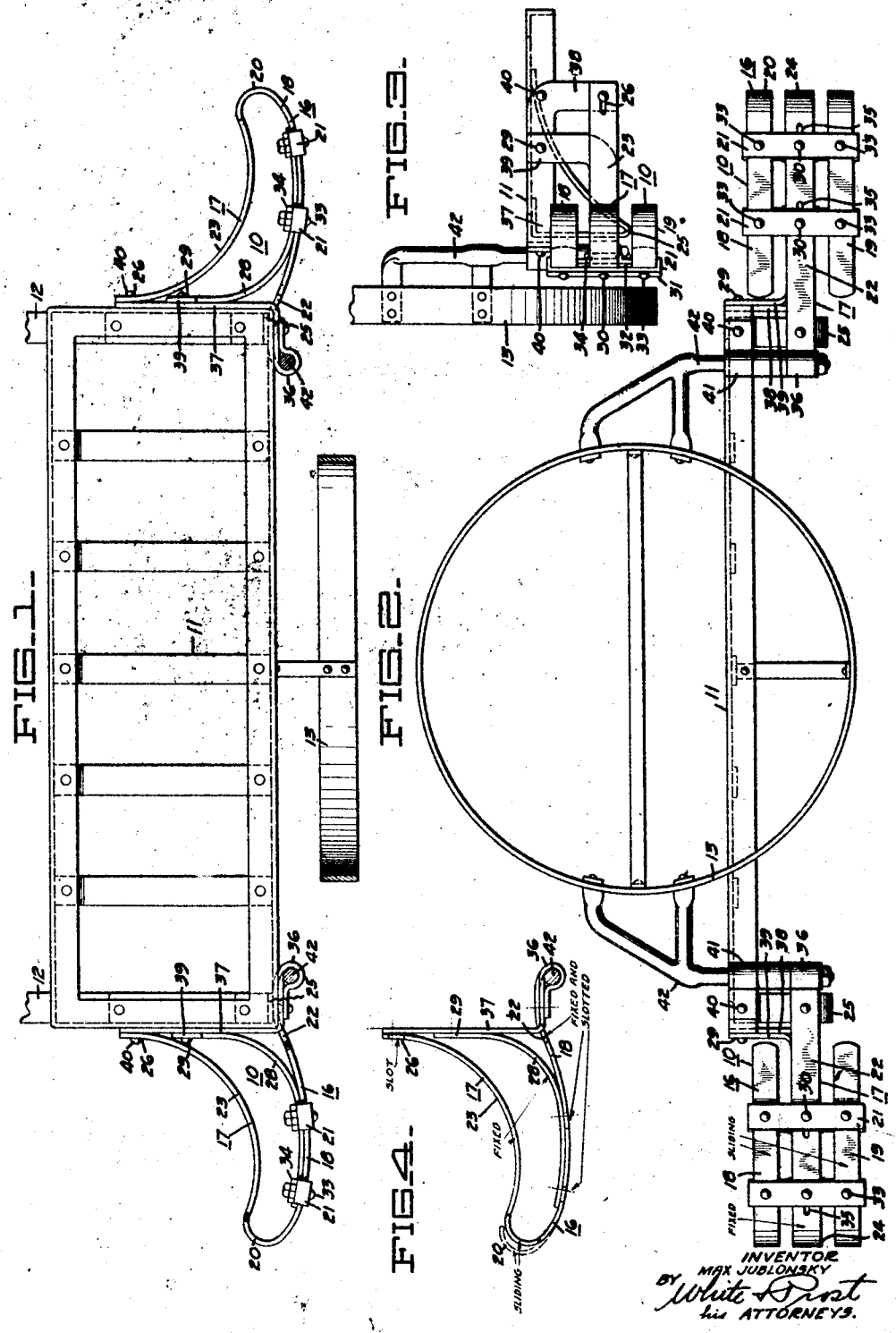

March 8, 1927.
M. JUBLONSKY
AUTOMOBILE BUMPER
Filed May 22, 1926
1,620,357
2 Sheets-Sheet 2
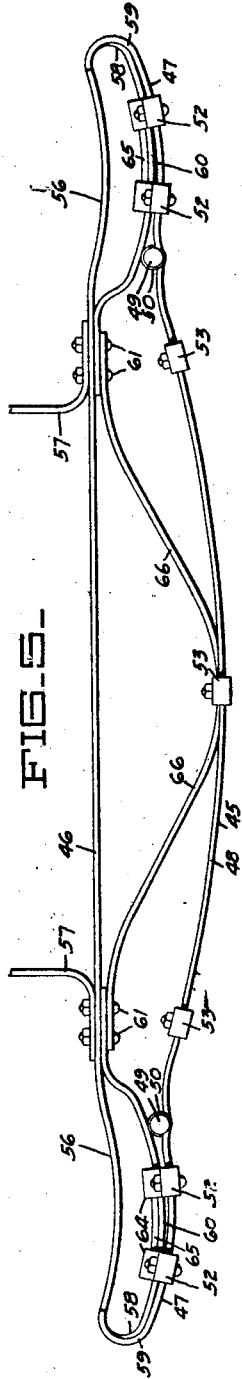
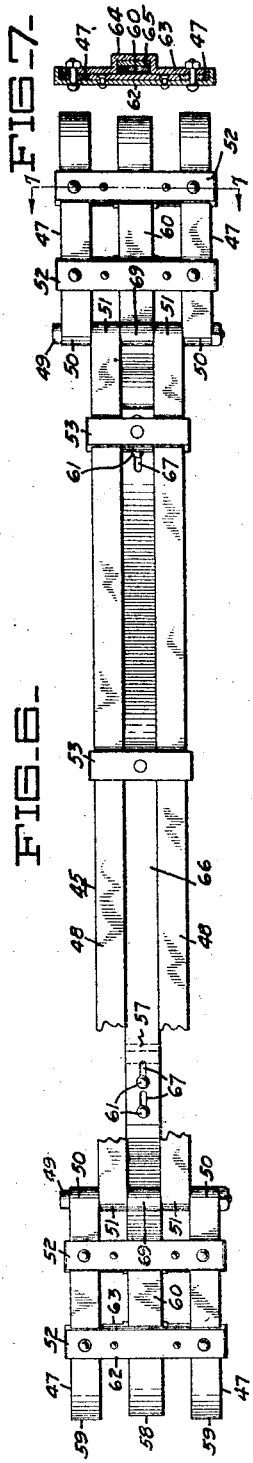
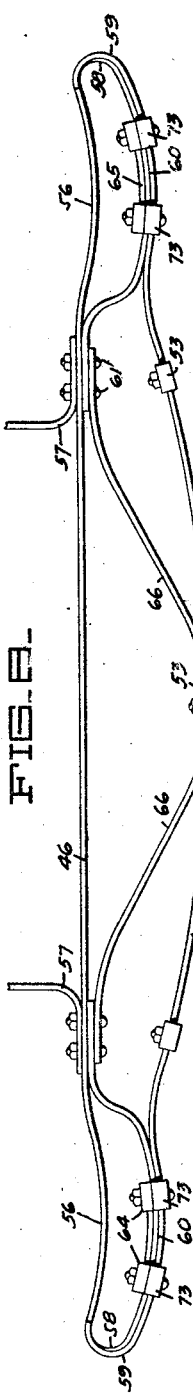
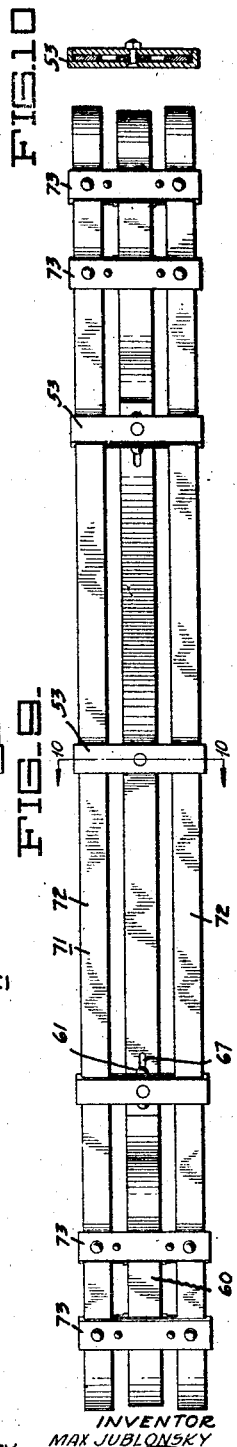
INVENTOR
MAX JUBLONSKY
BY White & Trist
his ATTORNEYS.

Patented Mar. 8, 1927.

1,620,357

UNITED STATES PATENT OFFICE.

MAX JUBLONSKY, OF SAN FRANCISCO, CALIFORNIA.

AUTOMOBILE BUMPER.

Application filed May 22, 1926. Serial No. 110,914.

This invention relates generally to devices intended to be used on automobiles or other vehicles for absorbing impacts.

Automobile bumpers are usually constructed of an impact member which is adapted to be secured in operative relationship upon either the front or the rear of an automobile by means of a support member. In order that the bumper shall have sufficient give to absorb impacts, it is customary to construct the support member of resilient spring steel bars which flex in resisting impact forces. Such bumpers have one inherent disadvantage in that since no means is provided for absorbing the energy of an impact, the rebound is of intensity equal to the impact. Thus if two automobiles collide, the rebound of an ordinary spring bumper is often sufficient to propel the lighter machine forward or backward with disastrous results.

It is an object of this invention to devise a bumper of novel construction which will incorporate relatively movable surfaces in frictional contact for absorbing the energy of impact, thus reducing rebound.

It is a further object of this invention to generally increase the resilience of a spring bumper by permitting relative longitudinal movement between the support and impact bars.

It is a further object of this invention to devise a bumper of the wing type which will tend to ward off impacts from the end of the bumper. It is proposed to accomplish this result by mounting the impact member in such a manner that it will move outwardly in resisting impacts, thus tending to ward off an object striking the bumper.

Further objects of this invention will appear from the following description in which I have set forth the preferred embodiment of my invention. It is to be understood that the scope of the invention is to be determined from the appended claims and the state of the prior art.

Referring to the drawings:

Figure 1 is a plan view of a rear bumper of the wing type embodying the principles of this invention.

Fig. 2 is a rear view of the bumper shown in Fig. 1.

Fig. 3 is a detail looking toward one end of the bumper shown in Figs. 1 and 2.

Fig. 4 is a detail showing one of the wings of the bumper shown in Figs. 1 and 2 and illustrating the operation of the same.

Fig. 5 is a plan view of a front bumper embodying certain principles of this invention.

Fig. 6 is a front view of the bumper shown in Fig. 5.

Fig. 7 is a cross sectional view taken along the line 7—7 of Fig. 6.

Fig. 8 is a plan view of a modified form of bumper.

Fig. 9 is a front view of the bumper shown in Fig. 8.

Fig. 10 is a cross sectional detail taken along the line 10—10 of Fig. 9.

Referring first to the rear type of bumper shown in Figs. 1 to 4 inclusive, there is shown a pair of wing fenders 10 which may be secured for example to a luggage carrier 11, the luggage carrier being mounted upon the chassis or frame 12 of an automobile. A tire carrier 13 may also be mounted upon the luggage carrier 11 so as to provide as a unit a combined rear bumper, luggage carrier and tire rack which may be readily mounted upon an automobile.

Each of the wing fenders 10 comprises generally an impact member 16 retained in operative position by means of a support member 17. The impact member 16 preferably comprises a plurality of vertically spaced impact bars 18 and 19 which are shown as provided with in-turned ends 20, the impact bars being secured together by suitable means such as one or more clamps 21. The support member 17 preferably comprises front and rear portions 22 and 23 which are preferably formed of a continuous bar bent to form a closed looped end 24 normally positioned in vertical registry with the in-turned ends of the impact bars. By front portion I refer to that portion which is nearest an observer positioned behind the automobile. The end of the front portion 22 is suitably anchored to a fixed support, such for example as a bracket 25 fixed to and depending from the end of the luggage carrier 11. The end of the rear portion 23 is also secured to the luggage carrier 11 or other suitable support at a point spaced to the rear of the bracket 25, a pin and slot connection 26 being preferably employed so as to permit relative sliding movement between the end of the rear portion 23 and the fixed support or luggage carrier 11.

In order to cause the impact member to move laterally in resisting an impact and in order to ward off objects from the end of the bumper, the impact member is anchored to the fixed support by means of a bar 28, one end of which is anchored as at 29 to the luggage carrier at a point spaced rearwardly a substantial distance from the bracket 25 and the other end being anchored to the impact bars 16 by suitable means such as the bolts 30 extending centrally of the clamps 21. One suitable form of clamp 21 comprises clamping faces 31 and 32 anchored at their ends to the impact bars 16 by suitable means such as bolts 33. The one clamp bar 32 may be bent so as to provide a guide way 34 for the front portion 22 of the support bar, slots 35 being provided in this portion to permit a limited sliding movement between the impact and support bars. In practice since it is desirable to mount the wing fenders in a plane below the luggage carrier, 11, the front portion 22 is doubled to form an eye 36 and is then provided with a rearward extension 37 having a depending end portion 38 for attachment to the inner support bar portion 23. The bar 28 may similarly be provided with an up-standing end portion 39 for anchoring to the extension 37. The extension 37 forms a convenient means for mounting the wing as a unit upon the luggage carrier 11. For example, it may be mounted by means of suitable bolts or rivets 40 and the bracket 25 which is fixed to one corner of the luggage carrier. The eye 36 is adapted to register with another eye 41 mounted upon the luggage carrier in order to serve as a means for detachably mounting the rod 42 of the tire rack 13.

When the above described bumper is in operation and an impact is received from the rear of an automobile the impact bars 16 will move rearwardly against the resistance of the support member 17 and the bar 28, and since the bar 28 is anchored at a point inwardly from the bracket 25, relative sliding movement will occur between the support and impact members and the impact bars will move outwardly toward the end of the bumper as shown in the dotted lines of Fig. 4. This lateral movement of the impact member in resisting impact forces tends to ward off an object from the end of the bumper, thus preventing the full force of the impact from being transmitted to the support member. The energy of an impact will be partially absorbed by friction or snubbing action between the forward support bar portion 22 and the clamps 21, this friction tending to increase in proportion to the magnitude of an impact force. The slot connection 26 also serves to make sliding movement between the inner support bar portion 23 and the fixed support in order to provide a support which will give readily for small impact forces but which will increase its resistance for greater forces when the inner bar portion 23 reaches the limit of its sliding movement with respect to the fixed support.

As shown in Figs. 5 to 10 inclusive, certain features of the invention may be incorporated in a bumper of the type in which the impact member extends entirely across the front or rear of an automobile. Thus the bumper shown in Figs. 5 to 7 inclusive comprises an impact member 45 which is adapted to be operatively disposed on an automobile by means of the support member 46. The impact member in this case has been constructed of a pair of end portions interconnected by an intermediate portion, each of the end portions comprising vertically spaced impact bars 47 while the intermediate portion comprises vertically spaced impact bars 48. The ends of the bars 48 are connected to the inner ends of the bars 47 by suitable means such as a pin or bolt 49 engaging registering eyes 50 and 51 in the bars 47 and 48 respectively. Clamps 52 serve to secure the bars 47 in spaced vertical relationship while clamps 53 serve a similar function with impact bars 48.

The support member 46 comprises a pair of members 56 which are secured to the frame of an automobile by suitable means such as brackets 57. In order to increase the strength of the bumper the members 56 are preferably constructed as one continuous length of bar material extending across the rear of the impact bars 48. The members 56 are each preferably bent to form a closed looped end 58 adapted to be positioned intermediate the in-turned ends 59 of the bars 47. The front portion 60 of each support member is extended inwardly and rearwardly and anchored at its end to the rear portion as by means of bolts or rivets 61. The clamps 52 are preferably constructed of front and rear clamping plates 62 and 63, the rear clamping plate 63 being offset as at 64 to receive the front portion 60 of the support member, so as to permit relative lateral movement of the impact bars 47 with respect to the support member. To insure a fairly tight fit between the clamps 52 and the forward bar portion 60, the clamps may be interconnected to the rear of the portion 60 by means of a strap 65. The impact bars 48 are preferably bowed outwardly as shown in Fig. 5 and in order to reinforce these elements reinforcing bars 66 are provided, these bars being interconnected at their inner ends, preferably being formed of a single member, and are anchored to a central clamp 53. The other ends of the bars 66 are inclined rearwardly and connected to the support member. Thus as shown, the outer ends of the bars 66 have been provided with slots 67 for providing a sliding connection with the bolts or rivets 61. This sliding connection insures more resilience to the bumper in resisting slight impacts but for heavy impacts the bars 66 will be put under buckling stress when the slots 67 have reached the limit of their movement. In order to prevent jamming of the ends of the impact bars 48 against the forward portion 60 of the support bar, a roller 69 may be disposed upon each of the pins 49 between the ends of the impact bars 48.

When an impact is received by a bumper such as described above, the bars 48 will be flexed rearwardly, thereby causing the pins 49 to be spread apart and the bars 47 to be moved outwardly. This movement will be resisted to a certain amount by friction between the relatively movable bars 47 and 60 so as to decrease the intensity of the rebound. The bars 66 will reinforce the impact bars 48 to a certain amount by being put under a bending stress until the slots 67 reach the limit of their movement, after which the reinforcing bars 66 will resist further movement by being put under a buckling stress. Thus the resistance which the bumper will offer to impact forces will increase at a rate which is disproportionate to the amount of the give or deflection. This is a very desirable feature as the bumper will cause less damage to other automobiles by being very resilient to light impacts.

The bumper shown in Figs. 8 to 10 inclusive is somewhat similar to that described above but differs in the construction of the impact bars. In this case the support member 46 is formed in the same manner as the bumper previously described but the impact member 71 comprises a plurality of impact bars 72 which preferably extend the entire width of the bumper, thus obviating the necessity of providing separate impact bars 47 and 48 as in the case of the construction of Figs. 5 and 6. The impact bars 72 are slidably supported adjacent their ends upon the front support bar portion 60 by suitable means such as the clamps 73.

I claim:

1. An automobile bumper having an impact member extending to the tip of the bumper, a support member, and means interconnecting the impact and support members for causing the impact member to move in the direction of the tip in resisting impacts.

2. An automobile bumper having an impact member extending to one tip of the bumper, and means for connecting the impact member to a fixed support whereby the impact member is moved outwardly in the direction of the tip in resisting forward impacts.

3. An automobile bumper comprising a support member including a bar forming a closed looped end, and a pair of impact bars secured to the front portion of said looped bar, said bars being spaced vertically whereby said front portion is positioned intermediate of the impact bars.

4. An automobile bumper comprising a support member including a bar forming a closed looped end, and a pair of impact bars secured to the front portion of said support, said impact bars extending to the tip of said looped end.

5. An automobile bumper comprising a support member including a bar forming a closed looped end, and a pair of impact bars secured to the front portion of said support, said impact bars extending to the tip of said looped end and being spaced above and below the front portion of the support bar.

6. An automobile bumper comprising a support member including a bar forming a closed looped end, and a pair of impact bars slidably secured to the front portion of the support bar and means for anchoring one portion of the impact bars whereby relative sliding movement occurs between said front portion and the impact bars in resisting forward impact.

7. An automobile bumper comprising a support member including a bar forming a closed looped end, and a pair of impact bars slidably secured to the front portion of the support bar and means for anchoring one portion of the impact bars whereby relative sliding movement occurs between said front portion and the impact bars in resisting forward impact, said impact bars being spaced above and below the front portion of said bar.

8. In a bumper of the wing type, a single looped bar and a plurality of impact bars slidably supported by said looped bar.

9. In a bumper of the wing type, impact and support members and energy absorbing means interconnecting said members.

10. In a bumper of the wing type, impact and support members and energy absorbing means interconnecting said members, said means comprising relatively movable surfaces in frictional contact.

11. A bumper of the wing type comprising an impact member adapted to be anchored to a fixed support, a support member adapted to be anchored at one of its ends to a fixed support, and means connecting said members, said means permitting relative sliding movement between said members when the bumper is resisting an impact force.

12. A bumper of the wing type comprising an impact member, said member comprising a plurality of vertically spaced bars, and a support member comprising a single looped bar, the front portion of the loop being secured to said impact bars intermediate the same.

13. A bumper of the wing type comprising an impact member, said member comprising a plurality of vertically spaced bars, and a support member comprising a single looped bar, the front portion of the loop being secured to said impact bars, the outer portion of the loop extending to the tip of the bumper.

In testimony whereof, I have hereunto set my hand.

MAX JUBLONSKY.